United States Patent [19]
Bondetti

[11] Patent Number: 4,815,183
[45] Date of Patent: Mar. 28, 1989

[54] CONTROLLED DEFLECTION ROLL

[75] Inventor: Mario Bondetti, Schio, Italy

[73] Assignee: Sulzer-Escher Wyss AG, Zurich, Switzerland

[21] Appl. No.: 91,744

[22] Filed: Aug. 31, 1987

[30] Foreign Application Priority Data

Sep. 5, 1986 [CH] Switzerland .................. 3576/86

[51] Int. Cl.[4] ............................................. B21B 13/02
[52] U.S. Cl. ................................. 29/116.2; 29/116.1; 100/162 B
[58] Field of Search ........... 29/116 AD, 116 R, 116.1, 29/116.2; 100/162 B

[56] References Cited

U.S. PATENT DOCUMENTS

| 3,802,044 | 4/1974 | Spillmann et al. | 29/116 AD |
|---|---|---|---|
| 3,846,883 | 11/1974 | Biondetti | 29/116 AD |
| 4,007,522 | 2/1977 | Hold et al. | |
| 4,064,607 | 12/1977 | Wolf | 29/116 AD |
| 4,328,744 | 5/1982 | Pau et al. | 29/116 AD |
| 4,472,865 | 9/1984 | Schul et al. | 29/116 AD |

Primary Examiner—Howard N. Goldberg
Assistant Examiner—Irene Coda
Attorney, Agent, or Firm—Werner W. Kleeman

[57] ABSTRACT

In a controlled deflection roll, hydrostatic support elements are used which can be tilted to an increased extent only in the axial direction but not in the circumferential direction of the roll shell. Deflection or bending of the stationary support member, on which the roll shell is supported by the hydrostatic support elements is compensated by the axial tilting capacity of such hydrostatic support elements. The transverse forces occurring during operation of the controlled deflection roll are automatically compensated by the supporting directions or direction of action of at least outer bearing pockets of the hydrostatic support elements and which form a predeterminate angle with the pressing direction, so that force components directed in the circumferential direction are formed which substantially counteract the prevailing transverse force. At the same time, special measures, such as increased tilting capacity in the circumferential direction, or a separate pressure control of the outer bearing pockets, can be dispensed with. It is particularly favorable, especially when there exist lower pressing forces, to provide hydrostatic support elements which also act in the opposite direction and are constructed in a similar manner.

13 Claims, 6 Drawing Sheets

CONTROLLED DEFLECTION ROLL

BACKGROUND TO THE INVENTION

The present invention relates to a new and improved construction of a controlled deflection roll, also typically known in the art as a flexure adjusting roll or a roll with bending or sag compensation.

Generally speaking, the controlled deflection roll of the present development is of the type comprising a rotatable roll shell which can be rotated about a stationary and non-rotating support member or beam. The roll shell is supported relative to the stationary and non-rotating support member or beam by a plurality of hydrostatic support or pressure elements arranged next to one another or in juxtaposition in the axial direction or axial direction of extent of the roll shell. In such controlled deflection rolls, the hydrostatic support elements are movable in the supporting direction thereof, in other words, in the direction in which such hydrostatic support elements support the rotatable roll shell, and these hydrostatic support elements are tiltable to a certain or predeterminate extent about the supporting direction. Normally each of the hydrostatic support elements possess, on their bearing surface facing the roll shell, at least two bearing pockets which are offset in the circumferential direction of the roll shell. These bearing pockets are connected by a pressure-reducing bore or throttle bore in flow communication with at least one pressure chamber from which a fluid under pressure is delivered or fed to the bearing pockets. The hydrostatic support elements are typically part of a piston-and-cylinder unit which allows the pressurized fluid in one or more cylinders thereof to urge an associated hydrostatic support element towards the roll shell, and each of which cylinders simultaneously bleeds to or flow communicates with related bearing pockets thereon.

Controlled deflection rolls of the above type are disclosed, for example, in U.S. Pat. No. 3,885,283, granted May 27 1975, and may be used in a press device or rolling mill so that, together with at least one back-up or counter roll, a web of material guided between both of these rolls can be subjected to a continuous and predictable pressure treatment.

As a result of the movement of the hydrostatic support elements in the roll shell-supporting direction in this kind of press device, the roll shell of the controlled deflection roll does not actually bend or adapt to the back-up or counter roll, so that there is attained a uniform pressing force or pressure or a pressing force or pressure with a desired force or pressure profile between the two rolls over their entire width, in other words, in the cross-machine direction. When a pressing force or pressure is exerted, only the stationary support member of the controlled deflection roll bend or deflects, but not, however, the roll shell. The inclination or bowing of the stationary support member relative to the roll shell is taken-up by the tilting capacity or capability of the hydrostatic support elements about the supporting direction, so that the hydrostatic support elements cannot bind or jam.

In this type of press device, a one-sided tilting moment is exerted on the hydrostatic support elements during the operation of the controlled deflection roll in the travel or running direction of the pressed or rolled material web, i.e. in the circumferential direction of the roll shell. In the controlled deflection roll disclosed in the aforementioned U.S. Pat. No. 3,885,283 an attempt was made to achieve a stable or equilibrium position in the pressing direction by the provision of several pressure pockets arranged next to one another on the bearing surface and which were connected to the same pressure chamber or compartment. Nonetheless, it was thought to be necessary to design the hydrostatic support elements in such a way that they were also tiltable in the circumferential direction in order to take-up or absorb this additional tilting moment; i.e. the hydrostatic support elements were made tiltable in all directions.

Notwithstanding the above, those skilled in this technology subsequently took the view that special measures were necessary to avoid the tilting of the hydrostatic support elements in the circumferential direction of the roll shell, as is apparent from British Patent Specification No. 2,143,302, published Feb. 6, 1985 or U.S. Pat. No. 4,520,723, granted June 4, 1985. To achieve this result, there was proposed separate control of the pressure in the bearing pockets located next to one another or in juxtaposition in the circumferential direction by means of suitable positioning sensors. For this purpose, the bearing pockets were connected to separate pressure chambers or compartments which, in turn, were separately supplied with a pressure medium at a different pressure.

The construction or design of the hydrostatic support element in such a manner that it is tiltable in all directions, necessitates a complicated shape or configuration of the piston-and-cylinder guide structure or unit, which increases the manufacturing costs and requires certain close tolerances to be adhered to for reliable operation. The separate control of the pressure in the adjacent pressure pockets also requires a complicated, expensive and trouble-prone control system.

SUMMARY OF THE INVENTION

Therefore, with the foregoing in mind, it is a primary object of the present invention to provide a new and improved construction of a controlled deflection roll which does not exhibit the aforementioned drawbacks and limitations of the prior art constructions.

Another important and more specific object of the present invention not only aims at avoiding the aforenoted drawbacks of the prior art constructions but, in particular, seeks to achieve reliable operation of a controlled deflection roll of the type described, but with much simpler construction, shape and manufacture thereof, and in which the necessary tolerances can be achieved with less effort and without the need for complicated control devices.

Yet a further noteworthy object of the present invention is directed to a new and improved construction of a controlled deflection roll which is relatively simple in construction and design, extremely reliable in operation, relatively economical to manufacture, not readily subject to breakdown or malfunction and requires a minimum of maintenance and servicing.

Now in order to implement these and still further objects of the invention, which will become more readily apparent as the description proceeds, the controlled deflection roll of the present development is manifested by the features that the degree of tilting or the tilting capacity or capability of the hydrostatic support elements is rendered greater in the axial plane containing the roll shell axis than in the radial plane disposed at right-angles thereto. The tilting capability or capacity in the radial plane can lie in the range of the clearance seating or play fit of the normal piston-and-cylinder fit. In contrast thereto, the tilting capability or capacity in the axial plane, may be increased by the provision of special measures or facilities for compensating the maximum possible deflection or bending of the stationary support member of the controlled deflection roll.

In its more specific aspects, there is thus contemplated the provision of a controlled deflection roll which comprises a roll shell or jacket supported on a stationary support member by means of a plurality of hydrostatic support elements spaced thereon in the axial direction of the roll shell or jacket. Each hydrostatic support element is provided with bearing pockets on a surface thereof juxtaposed with or confronting the inner surface of the roll shell or jacket and possesses at least one pressure chamber or compartment therein which is in fluid flow communication with the bearing pockets. The bearing pockets are circumferentially offset from each other with respect to the roll shell or jacket. There are also provided means for delivering a fluid under pressure to the at least one pressure chamber or compartment and to the bearing pockets in order to support the roll shell or jacket. Each hydrostatic support element is radially movable in a radial direction relative to the lengthwise or longitudinal axis of the roll shell or jacket and the capacity for tilting of the hydrostatic support elements in a plane containing the aforementioned roll shell lengthwise axis is greater than that in the radial plane disposed substantially perpendicular thereto.

It has been found that the arrangement of several bearing pockets next to one another in the circumferential direction of the roll shell or jacket and which are connected by throttle bores to the same pressure chamber or compartment or to pressure chambers or compartments exposed to essentially equal pressure, is adequate in order to achieve a stable position of equilibrium or equilibrium position of the hydrostatic support elements, even in the presence of additional transverse forces acting in the circumferential direction of the roll shell or jacket, provided the supporting direction or pressing direction of action of the outer bearing pockets form a sufficiently large angle with respect to the overall supporting or pressing direction of the hydrostatic support element. A recommended minimum angle between the bearing pockets is 20°, and a preferred range is 40° to 60°. Stated another way, the adjacent bearing pockets are each arranged at an angle of at least 10° with respect to the resultant supporting direction, and at an angle which preferably lies in a range between 20° and 30°. It is particularly advantageous if similar hydrostatic support or pressure elements are likewise provided in the opposite or counter direction.

Particularly good stabilization can be achieved if, apart from the central bearing pockets there are provided at the edges of the bearing surface, i.e. at a certain distance from the center, additional bearing pockets which are connected by throttle bores to the same pressure chamber as the central bearing pockets.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
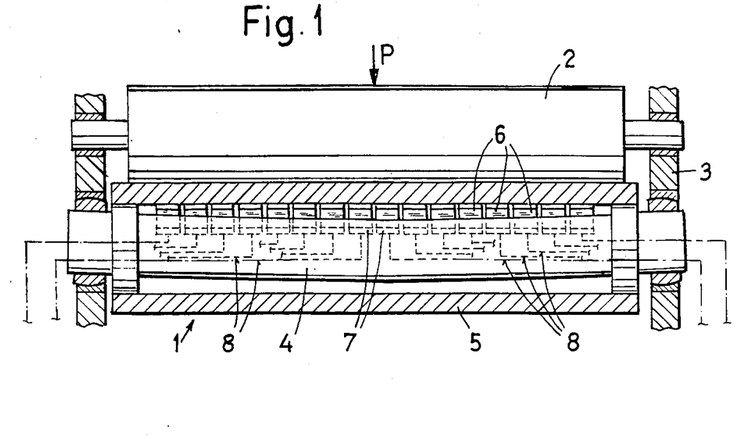
FIG. 1 shows a roll device or rolling mill equipped with a controlled deflection depicted in axial section.

Describing now the drawings, it is to be understood that to simplify the showing thereof, only enough of the structure of the sheet or material web rolling device or rolling mill and the construction of the different embodiments of controlled deflection roll designed according to the teachings of the present invention have been illustrated therein as is needed to enable one skilled in the art to readily understand the underlying principles and concepts of the present development. Turning attention now specifically to FIG. 1 of the drawings, there has been depicted therein a rolling device or rolling mill equipped with a controlled deflection roll 1 which interacts or cooperates with a conventional counter or back-up roll 2, which, for instance, may be a solid roll. The controlled deflection roll 1 has a stationary support member or beam 4 mounted non-rotationally in a roll stand or seating arrangement 3, and a roll shell or jacket 5 which is appropriately mounted to be rotatable about this stationary support member 4. The roll shell 5 is mounted on plurality of hydrostatic support or pressure elements 6 and is supported by the latter against the stationary support member 4 by means of piston-and-cylinder units or guide means having pressure chambers or compartments 7 which are supplied with pressure or pressurized fluid media at a predeterminate or certain pressure via one or more lines or conduits 8. Depending on the desired linear profile of the supporting force, the pressure in the pressure chambers or compartments 7 of the individual hydrostatic support elements 6 can at the same time, be adjusted equally or individually, for example, via separate feed lines or conduits 8 or the like or by means of other known measures or expedients.

Figures 2, 2A, 3, 3A:
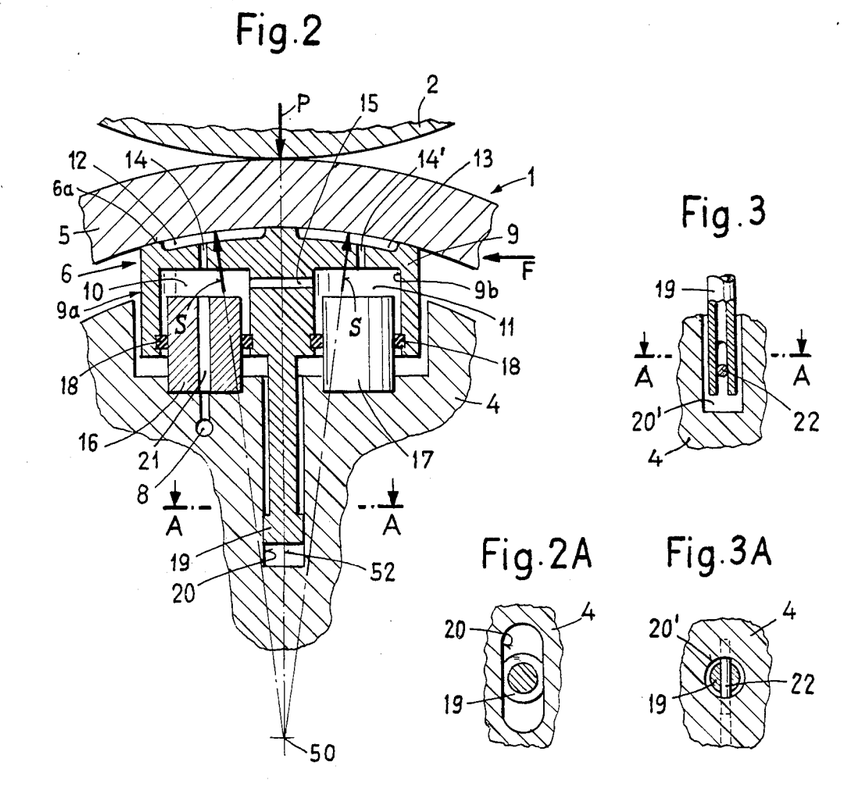
FIG. 2 shows on an enlarged scale in relation to the illustration of FIG. 1 a partial radial sectional view through a first embodiment of a controlled deflection roll constructed according to the teachings of the present invention.
FIG. 2A shows a section through the controlled deflection roll of FIG. 2 taken substantially along line A—A thereof.
FIG. 3 shows a detail of a second embodiment of controlled deflection roll constructed according to the teachings of the present invention.
FIG. 3A shows a section through the controlled deflection roll of FIG. 3 taken substantially alone the line A—A thereof.

FIG. 2 shows the construction and arrangement of one of the hydrostatic support elements 6 in radial section and in greater detail. The hydrostatic support element 6 comprises a head part or portion 9 in which there are provided two substantially cylindrical pressure chambers or compartments 10 and 11 which are arranged next to one another or in juxtaposed relationship in the circumferential direction of the roll shell or jacket 5. Arranged next to one another or in juxtaposed relationship in the circumferential direction on the bearing surface 6a of the hydrostatic support element 6 are two separate bearing pockets 12 and 13 which are connected in each case to one of the related pressure chambers 10 and 11 by throttle bores 14 and 14' or equivalent structure which cause a suitable pressure drop of the infed pressurized fluid medium. The two pressure chambers 10 and 11 are connected to one another or interconnected in flow communication with one another by a connecting line or conduit 15 so that at least approximately the same pressure prevails in both of these pressure chambers 10 and 11. The stationary support member 4 is provided with two substantially cylindrical attachments or projections 16 and 17 which, in each case, form a piston-and-cylinder guide or unit, generally indicated by reference character 9a, with the associated substantially cylindrical bores 9b in the head part or portion 9 of the related hydrostatic support element 6. Moreover, there are provided suitable seals or sealing elements 18 between the thus provided pistons and cylinders and these seals or sealing elements 18 are of such a size that the hydrostatic support element 6 can be inclined or tilted to a predeterminate or certain extent relative to the stationary support member 4 in a predetermined axial plane 52. This predetermined axial plane 52 is conjointly defined by the roll shell or jacket 5 and the plurality of hydrostatic support elements 6 and constitutes that plane which contains the lengthwise or longitudinal axis 50 of such roll shell or jacket 5 and extends axially centrally through the plurality of hydrostatic support elements 6.

However, the tilting capacity or capability in a radial plane —which radial plane extends substantially perpendicular to the axial plane 50 meaning a direction parallel to the circumference of the roll shell or jacket 5—is restricted by a foot or base portion 19 of the hydrostatic support element 6 which is joined or connected to the head part or portion 9. This foot or base portion 19 engages into an axially orientated elongated slot or slot means 20 provided in the stationary support member 4, namely in such a way that, although the foot or base portion 19 can be tilted or swivelled in the predetermined axial plane 52, a tilting movement is prevented in the aforementioned direction parallel to the circumference of the roll shell or jacket 5. Provided in the stationary support member 4 is a pressure-medium or connecting line 21 which, via a feed line 8, simultaneously supplies the two pressure chambers 10 and 11 with pressure medium of a predeterminate or certain pressure via the pressure-medium or connecting line 15.

FIG. 2A shows the foot or base portion 19 and the elongated slot 20 in the stationary support member 4 in which the foot or base portion 19 is guided in such a manner that it can be tilted in the predetermined axial plane 52 or in axial direction. Moreover, the length of the elongated slot 20 and the thickness of the foot or base portion 19 at the lower end are of such a size that the foot or base portion 19 can be moved and tilted or swivelled to a certain extent in the elongated slot 20 in the predetermined axial plane 52, but at right-angles thereto the foot or base portion 19 is almost impossible to tilt or only can be tilted to a lesser extent.

FIG. 3 shows a modified embodiment of the arrangement of FIG. 2 in which here the foot or base portion 19 is guided in a bore 20' of the stationary support member 4 by means of a mandrel or pin 22 or equivalent structure which is orientated in the axial direction and prevents tilting in the circumferential direction, while the diameters of the foot or base portion 19 and the bore 20' are of such a size that a certain tilting or swivelling capacity or capability is provided in the predetermined axial plane 52 or in axial direction.

FIG. 3A shows this exemplary embodiment of FIG. 3 in cross-section.

The heretofore described hydrostatic support elements 6 assume a stable position of equilibrium or equilibrium position not only under static conditions but also when a force F acts transversely to the hydrostatic support element 6, i.e. in the circumferential direction of the roll shell or jacket 5. This is so because, without the action of a transverse force F, both bearing pockets 12 and 13 exert equally large forces S. Under the action of a transverse force F it has been found that the bearing gap at the edge of one bearing pocket is opened slightly whereas the bearing gap at the opposite side is closed slightly, so that the pressure increases in one bearing pocket and decreases in the other bearing pocket. However, since the bores and connecting lines of both bearing pockets and pressure chambers or compartments offer a certain flow resistance, slightly different forces subsequently result which arise in such a way that the horizontal resultant exactly or substantially counteracts the additional transverse force F. Moreover, it has surprisingly been found that the transverse forces F can be adequately compensated without an increased tilting capacity or capability of the hydrostatic support elements 6 in the circumferential direction being necessary, whereas in the axial direction a tilting capacity or capability of the hydrostatic support elements 6 is indispensable as a result of the unavoidable deflection or bending of the stationary support member 4. If necessary, a tilting capacity exceeding that of the normal piston-cylinder guide or unit can be completely dispensed with in the circumferential direction.

Figure 4:
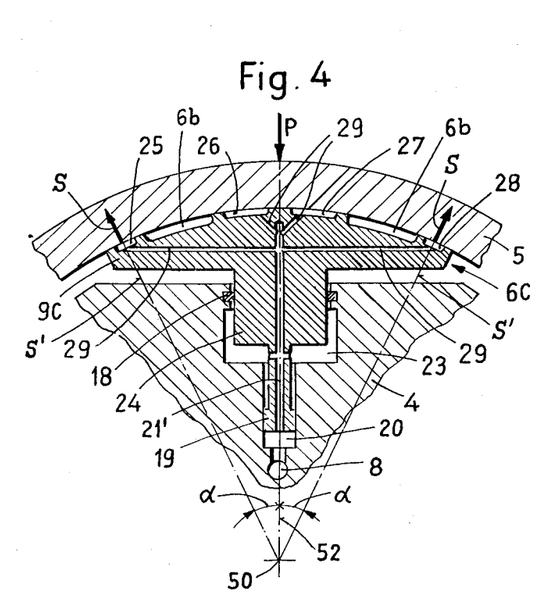
FIG. 4 shows a partial radial section through a third embodiment of a controlled deflection roll constructed according to the teachings of the present invention.
Figure 4A:
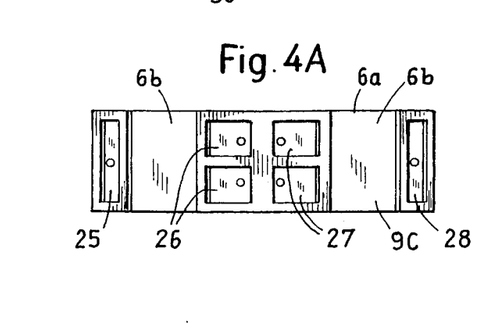
FIG. 4A shows a plan view of the bearing surface of the controlled deflection roll of FIG. 4.

In FIG. 4, another embodiment of controlled deflection roll is shown in which the substantially cylindrical bore and the pressure chamber 23 are provided in the stationary support member, 4 whereas the head part 9C of the support element body of the support element 6C serves as the piston or piston member 24. In this embodiment, four sets of bearing pockets 25, 26, 27 and 28, which are connected to the common pressure chamber 23 by throttle bores 29, are provided in the circumferential direction on the bearing surface 6a of the head part 9C of the support element body. Here, the central supporting bearing pockets 26 and 27 are preferably used for producing the requisite supporting force. The outer or centering bearing pockets 25 and 28 on the circumferential periphery of the hydrostatic support element 6C are separated from these central supporting bearing pockets 26 and 27 by intermediate spaces 6b, so that the outer or centering bearing pockets 25 and 28 exert a force S pressing direction 5 which extends at a certain angle to the overall supporting or pressing direction or the predetermined axial plane 52.

As a result of this angular orientation, a horizontal force component develops which essentially establishes equilibrium with the transverse force, such as the transverse force F indicated in FIG. 2, occurring in operation. The outer or centering bearing pockets 25 and 28 are therefore preferably used for centering during operation of the controlled deflection roll under dynamic conditions. The pressure-medium feed from the feed line 8 to the pressure chamber 23 is effected here via a line or conduit 21' provided in the foot or base portion 19 of the hydrostatic support element 6C.

Here too, however, the foot or base portion 19 can be made in a similar manner to the embodiment according to FIGS. 3 and 3A.

Figure 5:
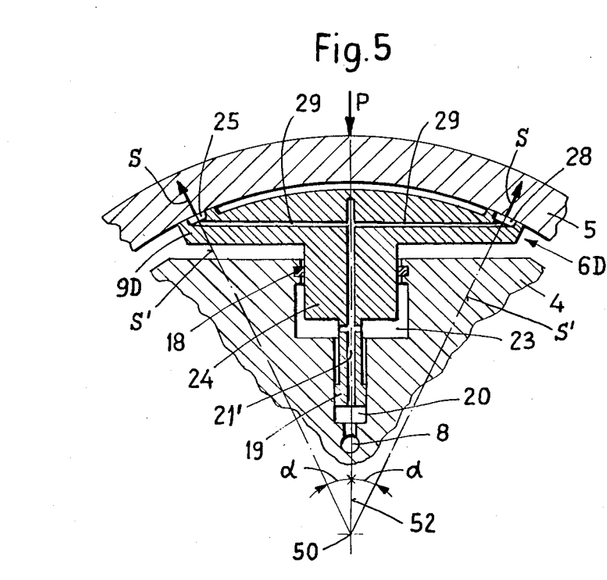
FIG. 5 shows a partial radial section through a fourth embodiment of a controlled deflection roll constructed according to the teachings of the present invention.

In FIG. 5, a similar hydrostatic support element 6D is shown which has only outer or centering bearing pockets 25 and 28 at head part 9D but no central supporting bearing pockets. Hydrostatic support or pressure elements 6D of this type are especially suitable when they are preferably intended to be used for compensating transverse forces, with lower load-carrying capacities being required.

Figure 5A:
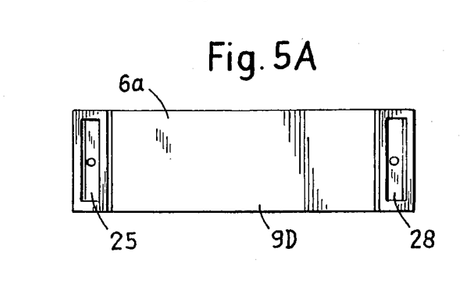
FIG. 5A shows a plan view of the bearing surface of the controlled deflection roll of FIG. 5.

FIG. 5A shows a plan view of the bearing surface 6a of such a hydrostatic support element 6D having only the outer or centering bearing pockets 25 and 28.

In practical operation, for example in the case of high-speed papermaking machines or light-metal rolling devices or rolling mills, it has been found that the there occurring transverse forces can be compensated without any individual control of the pressures prevailing in the individual bearing pockets or pressure chambers or compartments and without additional circumferential tilting capacity, provided the angle α between the pressure pressing directions of the outer or centering bearing pockets and the overall supporting or pressing direction or the predetermined axial plane 52 is above 10°, preferably in the range between 20° and 30°. Still larger angles have been found to be appreciable more favorable. In the individual case, the requisite angle α, for given transverse forces F and a given pressing forces, can be determined by suitable measurements.

Figure 6:
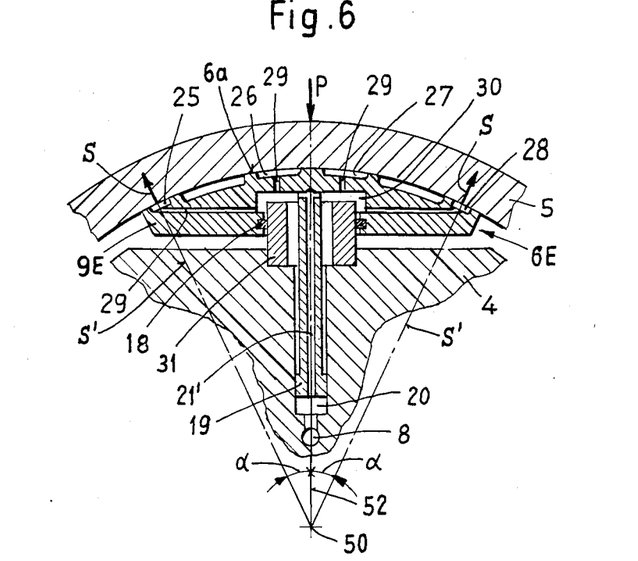
FIG. 6 shows a partial radial section through a fifth embodiment of a controlled deflection roll constructed according to the teachings of the present invention.

FIG. 6E shows a hydrostatic support element 6 in which a substantially cylindrical pressure chamber 30 is provided in the head part or portion 9E of the hydrostatic support element 6E, while an attachment or protrusion of the stationary support member 4 serves as a piston 31. The bearing surface 6a at the head part 9E of the hydrostatic support element 6E again has four or four sets of bearing pockets 25, 26, 27 and 28 adjacently arranged or disposed next to one another in the circumferential direction, with outer or centering bearing pockets 25 and 28 again being used for centering and being separated by intermediate spaces from the central supporting bearing pockets 26 and 27 which are used for producing the overall supporting or pressing force.

Figure 7:
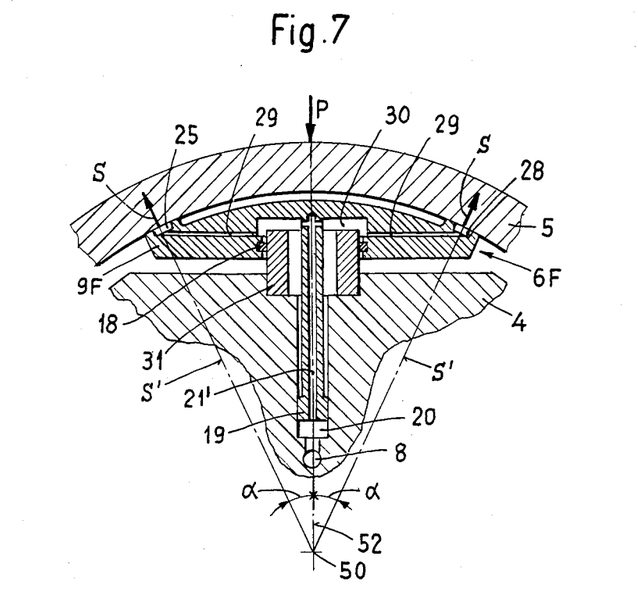
FIG. 7 shows a partial radial section through a sixth embodiment of a controlled deflection roll constructed according to the teachings of the present invention.

FIG. 7 hows an analogous hydrostatic support element 6F without central supporting bearing pockets in the head part 9F.

Figure 8:
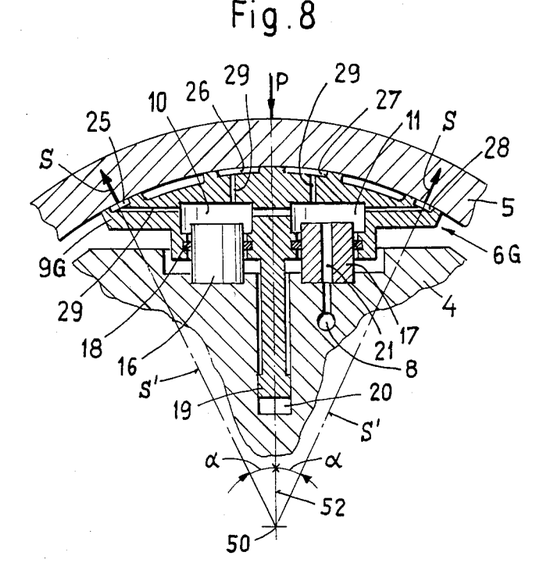
FIG. 8 shows a partial radial section through a seventh embodiment of a controlled deflection roll constructed according to the teachings of the present invention.

FIG. 8 shows a further embodiment of a hydrostatic support element 6G which, like the embodiment according to FIG. 2, has two separate pressure chambers or compartments 10 and 11, wherein an outer supporting bearing pocket 25 and 28, respectively, and a central supporting bearing pocket or pockets 26 and 27, respectively, in a head part 9G are connected in each case to one of the pressure chambers 10 and 11, respectively, which are flow connected to one another.

Figure 9:
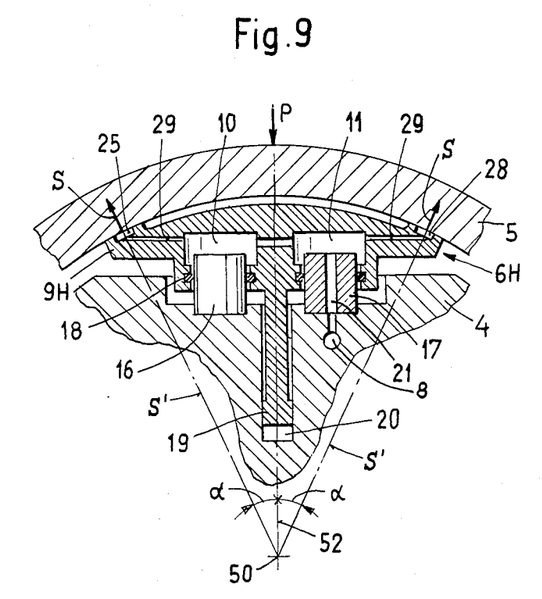
FIG. 9 shows a partial radial section through an eighth embodiment of a controlled deflection roll constructed according to the teachings of the present invention.

FIG. 9 shows an analogous hydrostatic support element 6H without central supporting bearing pockets in the head part aH.

Figure 10:
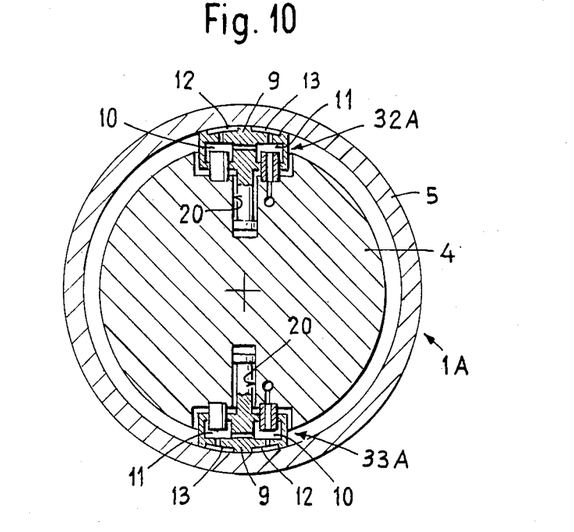
FIG. 10 shows a radial section through a ninth embodiment of a controlled deflection roll constructed according to the teachings of the present invention with various hydrostatic support elements.

FIG. 10 shows in radial section a controlled deflection roll 1A which has hydrostatic support elements 32A and 33A constructed according to the showing of FIG. 2 on both the pressing side and the diametrically opposite side. The hydrostatic support elements 33A constitute counter-supporting elements in this arrangement and can be used, on the one hand, for centering the roll shell or jacket 5, and on the other hand, for exerting a counterforce in certain areas or regions, for example in the edge areas or regions of the controlled deflection roll 1A if this is required in practical operation.

Moreover, the use of counter-supporting sources or structure has the advantage that larger transverse forces can be compensated, even when smaller pressing forces are present.

Figure 11:
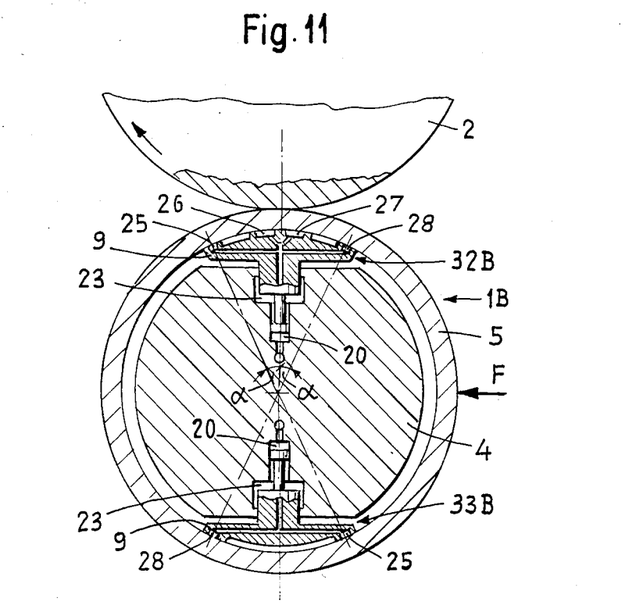
FIG. 11 shows a radial section through a rolling device or rolling mill.

FIG. 11 shows such a rolling device or rolling mill in which the controlled deflection roll 1B, on the pressing side, has a hydrostatic support element 32B analogous to the hydrostatic support element 6C described hereinbefore with reference to FIG. 4, which has both outer or centering bearing pockets 25 and 28 for centering or central supporting and inner bearing pockets 26 and 27 for producing the overally supporting or pressing force. In contrast, the counter-supporting elements 33B can be made either without central supporting bearing pockets analogous to the hydrostatic support element 6D shown in FIG. 5, or else, as in the hydrostatic support element 6C shown in FIG. 4, with central support bearing pockets.

Figure 12A:
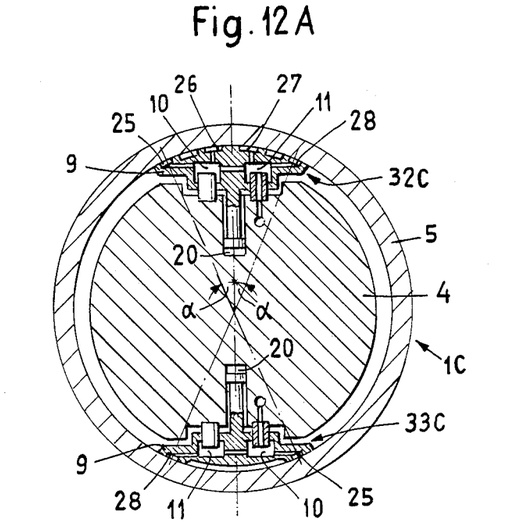
FIGS. 12A and 12B show respective radial sections through further embodiments of controlled deflection rolls constructed according to the teachings of the present invention with different hydrostatic support elements.
Figure 12B:
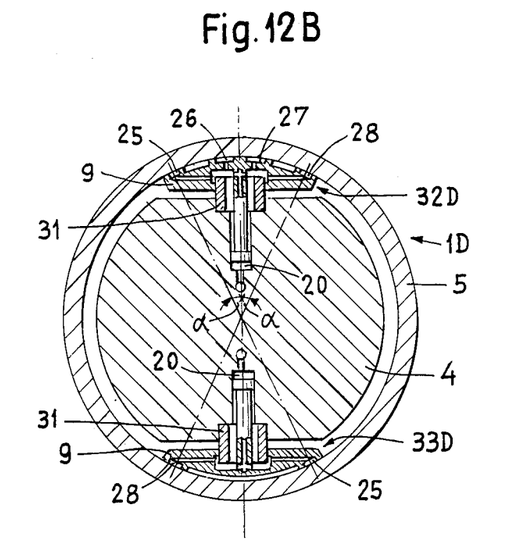

Finally, FIGS. 12A and 12B show constructions of respective controlled deflection rolls 1C and 1D in which the respective hydrostatic support element 32C and 32D on the pressing side are constructed according to the hydrostatic support elements 6G and 6E shown in FIGS. 8 and 7, respectively, and the counter-supporting elements 33C and 33D are respectively constructed according to the hydrostatic support elements 6H and 6F shown in FIGS. 9 and 7, respectively.

While there are shown and described present preferred embodiments of the invention, it is to be distinctly understood that the invention is not limited thereto, but may be otherwise various embodied and practiced within the scope of the following claims.

What I claim is:

1. A controlled deflection roll comprising:

a stationary support member;

a roll shell rotatable about said stationary support member;

said roll shell having an inner surface and a lengthwise axis;

a plurality of hydrostatic support elements arranged in axially mutually spaced relationship substantially parallel to the lengthwise axis of the roll shell between the inner surface of the roll shell and the stationary support member;

said plurality of hydrostatic support elements supporting the roll shell on the stationary support member;

each hydrostatic support element being provided with centering bearing pockets on a surface thereof juxtaposed with respect to the inner surface of the roll shell;

means defining at least one pressure chamber for each hydrostatic support element and which pressure chamber is in flow communication with the centering bearing pockets of the hydrostatic support element;

said centering bearing pockets being circumferentially offset from each other with respect to the roll shell;

means for delivering a fluid under pressure to the at least one pressure chamber and to the centering bearing pockets of each hydrostatic support element in order to support the roll shell;

each hydrostatic support element being radially movable in a radial direction relative to the lengthwise axis of the roll shell;

each one of said centering bearing pockets defining an associate pressing direction radially extending from said lengthwise axis of said roll shell;

said roll shell and said plurality of hydrostatic support elements defining a predetermined axial plane containing said lengthwise axis of said roll shell and extending axially centrally through said plurality of hydrostatic support elements;

said centering bearing pockets being located on opposite sides of said predetermined axial plane;

each one of said pressing direction associated with said centering bearing pockets, forming, with said predetermined axial plane, a predetermined angle of at least 10 degrees; and means mounting said hydrostatic support elements to be solely tiltable in said predetermined axial plane.

2. The controlled deflection roll as defined in claim 1, wherein:

said means defining said at least one pressure chamber comprises at least one piston-and-cylinder unit which accommodates the radial movement and tilting of the hydrostatic support element solely in said predetermined axial plane.

3. The controlled deflection roll as defined in claim 2, wherein:

said at least one piston-and-cylinder unit comprises at least one piston mounted on the stationary support member beneath each hydrostatic support element;

said at least one piston-and-cylinder unit further comprises at least one cylinder defined by each hydrostatic support element which receives at least one piston mounted on the stationary support member beneath each hydrostatic support element such as to permit tilting of said hydrostatic support element solely in said predetermined axial plane; and the at least one pressure chamber being disposed within the at least one cylinder of the hydrostatic support element.

4. The controlled deflection roll as defined in claim 1, wherein:

said means mounting said hydrostatic support elements to be solely tiltable in said predetermined axial plane comprises slot means disposed beneath said hydrostatic support elements and provided at the stationary support member;

each hydrostatic support element being provided with a foot depending therefrom and received in said slot means; and said slot means permitting movement of the foot in the predetermined axial plane but essentially restricting such movement in a direction parallel to the circumference of said roll shell.

5. The controlled deflection roll as defined in claim 4, wherein:

said slot means comprises separate slots each of which is provided radially beneath an associated one of said plurality of hydrostatic support elements.

6. The controlled deflection roll as defined in claim 1, wherein:

each hydrostatic support element has a foot depending therefrom;

said means mounting said hydrostatic support elements to be solely tiltable in said predetermined axial plane, containing axially orientated mandrel means mounted in a bore of the stationary support member; and each said foot being formed with a slot which engages said axially orientated mandrel means mounted in said bore of the stationary support member; and each said foot being slidable on the axially orientated mandrel means to permit tilting of the hydrostatic support elements solely in said predetermined axial plane but essentially is precluded from tilting in a direction parallel to the circumference of said roll shell.

7. The controlled deflection roll as defined in claim 6, wherein:

said axially oriented mandrel means comprises separate axially oriented mandrel means each of which is provided radially beneath an associated one of said plurality of hydrostatic support elements.

8. The controlled deflection roll as defined in claim 1 wherein:

said angle is in the range of 40° to 60°.

9. The controlled deflection roll as defined in claim 1, wherein:

each one of said plurality of hydrostatic support elements additionally comprises central supporting bearing pockets located between said centering bearing pockets and circumferentially spaced in juxtaposition with respect to the inner surface of the roll shell; and means for placing said central supporting bearing pockets in flow communication with said at least one pressure chamber.

10. The controlled deflection roll as defined in claim 9, wherein:

the centering bearing pockets are separated from the central supporting bearing pockets by intermediate spaces.

11. The controlled deflection roll as defined in claim 1, further including:
- additional hydrostatic support elements arranged on the stationary support member and acting on a diametrically opposite side of the roll shell.

12. The controlled deflection roll as defined in claim 11, wherein:
- each one of said plurality of hydrostatic support elements additionally comprises central supporting bearing pockets located between said centering bearing pockets and circumferentially spaced in juxtaposition with respect to said inner surface of the roll shell;
- means for flow communicating said central supporting bearing pockets with said at least one pressure chamber; and
- each of said additional hydrostatic support elements acting on the diametrically opposite side of the roll shell, possesses only centering bearing pockets.

13. A controlled deflection roll comprising:
- a stationary support member;
- a roll shell rotatable about said stationary support member;
- said roll shell having an inner surface, and a lengthwise axis;
- a plurality of hydrostatic support elements arranged in a series substantially parallel to said lengthwise axis of the roll shell between the inner surface of the roll shell and the stationary support member;
- said plurality of hydrostatic support elements supporting the roll shell on the stationary support member;
- each hydrostatic support element containing centering bearing pockets on a surface thereof juxtaposed with respect to the inner surface of the roll shell;
- means defining at least one pressure chamber in flow communication with the centering bearing pockets of the hydrostatic support elements;
- said centering bearing pockets being circumferentially offset from each other with respect to the roll shell;
- means for delivering a fluid under pressure to the at least one pressure chamber and to the centering bearing pockets of the hydrostatic support elements in order to support the roll shell;
- each hydrostatic support element being radially movable in a radial direction relative to the lengthwise axis of the roll shell;
- each one of said centering bearing pockets defining an associated pressing direction radially extending from said lengthwise axis of said roll shell;
- said roll shell and said plurality of hydrostatic support elements defining a predetermined axial plane containing said lengthwise axis of said roll shell and extending axially centrally through said plurality of hydrostatic support elements;
- said centering bearing pockets being located on opposite sides of said predetermined axial plane;
- each one of said pressing directions associated with said centering bearing pockets, forming, with said predetermined axial plane, a predetermined angle of at least 10 degrees; and
- means mounting said hydrostatic support elements to be essentially solely tiltable in said predetermined axial plane.

* * * * *